Patented Dec. 12, 1944

2,364,737

UNITED STATES PATENT OFFICE 2,364,737

ETHERS

Frank Clifton McGrew, Wilmington, Del., assignor to E. I. du Pont de Nemours & Company, Wilmington, Del., a corporation of Delaware No Drawing. Application October 11, 1940,
Serial No. 360,835

16 Claims. (Cl. 260—561)

This invention relates to new derivatives of amides of polycarboxylic acids and methods for their manufacture.

The invention has as an object the development of a method suitable for the conversion of N-methylol derivatives of polycarbonamides to their ethers. A further object is the preparation of N-methylol ethers of polycarbonamides. Still another object is the utilization of N-methylol ethers of polycarbonamides in molding and coating compositions and in finishing textiles. Other objects will appear hereinafter.

These objects are accomplished by the following invention wherein monomeric poly(carbonamidomethyl) ethers are obtained by the reaction of a poly(N-methylolcarbonamide) under substantially anhydrous conditions at a temperature below 100° C. in the presence of a catalyst having a hydrogen ionization constant of at least $1 \times 10^{-2}$ with an alcohol containing not more than five carbon atoms in which the carbinol carbon bears at least one hydrogen atom.

The products of this invention are preferably obtained by a process conducted substantially as follows: An anhydrous liquid medium containing a poly(N-methylolcarbonamide) in solution or in suspension and at least an equivalent amount of an alcohol, and preferably an excess of 50 to 300%, is agitated in a reactor which is maintained at a temperature preferably between 70° C. and 0° C. by external cooling. An anhydrous mineral acid condensing agent is introduced gradually until a sufficient quantity is present to effect the desired etherification reaction. The completion of the reaction is conveniently determined by the disappearance of the suspended starting material since it dissolves as it is converted to the corresponding ether. The reaction product now present in the solution may be isolated by cooling to 0° C. or below which causes the separation of a crystalline solid from which small amounts of condensing agent may be removed by washing with inert solvents. Alternatively, the solution of the reaction product may be treated with an anhydrous base in sufficient quantity to neutralize the condensing agent before the product is separated by cooling.

The products of the invention are monomeric poly(carbonamidomethyl) ethers, i. e. compounds having a plurality of carbonamide groups containing an etherified methylol substituent. These ethers have at least two of the following groups: (—CO—NH—CH₂—OR), in which R is a monovalent organic radical.

Some of the initial reactant materials employed in this invention have previously been disclosed. Thus dimethylolsuccinamide is disclosed in Beilstein, 4th edition, vol. 2, p. 615, and dimethyloloxamide in Chemical Abstracts 27, 3163. The other polymethylolcarbonamides can be prepared by simple methods analogous to those mentioned in these references. A typical synthesis is as follows: Sixty parts of sebacamide is added to a solution of 50 parts of 37% formalin in 160 parts of water made alkaline with potassium carbonate. The mixture is boiled for about 40 minutes to dissolve the sebacamide and then cooled. Dimethylolsebacamide separates out in good yield. In a similar way, fumaramide is converted to dimethylolfumaramide and tricarballylamide is converted to N,N',N''-trimethyloltricarballylamide. For use in this invention, the reactants should preferably be substantially anhydrous. Ordinary commercial grades of solvents such as methanol are satisfactory.

The more detailed practice of the invention is illustrated by the following examples, wherein parts given are by weight. There are of course many forms of the invention other than these specific embodiments.

Example I

Anhydrous hydrogen chloride gas (about 0.42 part; 0.023 equivalent based on the dimethyloladipamide) is slowly introduced into a suspension of fifty-one parts of dimethyloladipamide in 160 parts of methanol at 50° C. until, at the end of about 20 minutes, all the suspended dimethyloladipamide is dissolved. The solution is clarified by filtration and cooled to 0° C., which causes the precipitation of a copious white crystalline material. After adding 200 parts of ether, the solid product is separated by filtration and dried in a vacuum oven at 65° C. The N,N'-bis(methoxymethyl) adipamide thus obtained melts sharply with decomposition at 116° C. and amounts to 41 parts in weight, which is equivalent to 71% yield.

Analysis: Calculated for $C_{10}H_{20}O_4N_2$: N, 12.07; C, 51.71; H, 8.68; found (Dumas): N, 11.94; C, 51.33; H, 8.68.

Example II

To a solution of 4 parts of hydrogen chloride (0.4 equivalent based on the dimethyloloxamide) in 640 parts of methanol is added 21 parts of dimethyloloxamide. The mixture is boiled under reflux for one hour, which causes the dimethyloloxamide to dissolve, and is subsequently cooled to 0° C. The cold solution deposits 16 parts (64% yield) of NN,'-bis(methoxymethyl)-oxamide which, after drying at 60° C. melts sharply at 139° C. without decomposition.

Analysis: Calculated for $C_6H_{12}O_4N_2$: N, 15.91; found (Kjehldahl): N, 16.07.

Example III

A suspension of 12 parts of dimethylolfumaramide in 240 parts of methanol is boiled under reflux while one part of concentrated sulfuric acid (specific gravity 1.84; 0.26 equivalent based on the dimethylol derivative) is added. The N,N'-bis(methoxymethyl)fumaramide which is isolated by cooling the clear solution thus obtained amounts to 11 parts (79% yield) of a crystalline solid melting with decomposition at 218° C.

Analysis: Calculated for $C_8H_{14}O_4N_2$: N, 13.86; found (Dumas): N, 13.45.

Example IV

A suspension of 120 parts of dimethylolsuccinamide in 2000 parts of methanol at 25° C. is treated with 5 parts of hydrogen chloride gas (0.1 of the amount equivalent to the succinamide derivative) which causes the dimethylol derivative to dissolve with the formation of N,N'-bis(methoxymethyl)succinamide. This product, isolated by evaporation of the solution, melts sharply at 114° C. with decomposition and amounts to 70 parts (60% theory).

Analysis: Calculated for $C_8H_{16}O_4N_2$: N, 13.72; found (Dumas): N, 13.80.

Example V

Forty parts of dimethylolsebacamide is suspended in 320 parts of methanol at 25° C. and 5 parts of hydrogen chloride (0.45 equivalent based on the dimethylolsebacamide) is introduced during one-half hour. The clear solution remaining at the end of this period is neutralized by the addition of a methanol solution of sodium methylate (7.4 parts). The sodium chloride formed is removed by filtration, and the filtrate concentrated to 60 parts. The N,N'-bis(methoxymethyl)sebacamide which separates during concentration of the reaction mixture is purified by recrystallization from methanol. The product (20 parts, 45% yield) melts sharply at 122° C. with decomposition.

Analysis: Calculated for $C_{14}H_{28}O_4N_2$: N, 9.72; found (Dumas): N, 9.59.

The process of the present invention is of generic applicability to the etherification of poly(methylolcarbonamides) with monohydric alcohols having up to five carbont atoms. Thus the etherification of dimethyloladipamide with butanol leads to N,N'-bis(butoxymethyl)adipamide; the reaction of trimethyloltricarballylamide with methanol in the presence of an acid-type catalyst leads to N,N',N''-tris(methoxymethyl)tricarballylamide; and the etherification of dimethyloloxamide with beta-methoxyethanol leads to N,N'-bis(beta-(methoxy)-ethoxymethyl)oxamide. Many other ethers can be similarly prepared from lower monohydric alcohols and the methylol derivatives of polycarbonamides. The poly(N-methylolcarbonamides) which are operable in this invention are formulated as $R(CONHCH_2OH)_x$ in which $x$ is an integer greater than 1 and R is an $x$-valent organic radical or is nonexistent. (In the case of dimethyloloxamide employed in Example II, R is absent.) The $x$-valent radical joining the N-methylolcarbonamide groups may be aliphatic or aromatic, cyclic or acyclic, homocyclic or heterocyclic, saturated or unsaturated, and may be unsubstituted or substituted by groups, such as ether, sulfide, ketone, ester, amide, halogen, and the like, which do not interfere with the etherification reaction. Thus there may be employed the N,N'-dimethylol derivatives of malonamide, glutaramide, pimelamide, suberamide, azelamide, beta-methyladipamide, 4-keto-pimelamide, terephthalamide, tetraethylsuccinamide, camphoronamide, hexahydroterephthalamide, muconamide, aconitamide, acetylenedicarbonamide, chlorosuccinamide, diphenamide, diglycollamide, thiodiglycollamide, dithiodiglycollamide, trimethylaminetricarbonamide $N(CH_2-CO-NH_2)_3$ and brassylamide. A preferred class of poly(N-methylolcarbonamides) is that of the di(N-methylolcarbonamides). Of these, the compounds having two N-methylolcarbonamide groups attached to a bivalent aliphatic hydrocarbon, preferably polymethylene, radical are more desirable. They are not subject to interfering side reactions.

In the process of this invention the poly(N-methylolcarbonamide) compound may be reacted with any monohydric alcohol of up to five carbon atoms having at least one hydrogen on the carbinol carbon. Thus, the alcohol may be primary or secondary. The organic residue to which the hydroxyl group is attached may be cyclic or acyclic, homocyclic or heterocyclic, saturated or unsaturated, and unsubstituted or substituted by groups such as ether, sulfide, ketone, and halogen which do not interfere with the reaction. Specific suitable alcohols, in addition to those disclosed in the examples, include the following: ethanol, propanol-1, propanol-2, butanol-2, beta-ethoxyethanol, 3-thiapentanol-1, pentanol - 1, pentanol - 2, pentanol - 3, cyclobutanol, 3-oxacyclobutanol-1

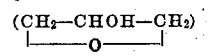

3-ketobutanol-1, trimethylene chlorohydrin and 3-methylbutanol-1. Completely aliphatic alcohols are more desirable and of these the primary aliphatic monohydric alcohols are preferred.

The use of a solvent in the process of this invention is optional, since the alcohol employed as one ingredient may serve as the reaction medium. It may be desired to supplement the alcohol with another organic liquid in order to increase the reaction volume while conserving the alcohol, or to increase the solubility of the poly-(N-methylolcarbonamide) in the medium. Any solvent which is miscible with the alcohol employed and unreactive toward any of the components of the mixture may be used, including acetone, dioxane, and ethylene glycol dimethyl ether. The quantity of diluent which may be used is not restricted. The reaction mixture should be substantially anhydrous. This does not mean that water must be entirely absent, but that, preferably, ordinary precautions are taken to exclude moisture, since the yield is diminished if appreciable amounts of water are present.

In the foregoing examples, the amount of alcohol employed is in considerable excess over the poly(N-methylolcarbonamide), but this need not be the case. If less than the stoichiometrical amount of alcohol is used, the process is operable, but the yield of methylol ether is not as high since some poly(N-methylolcarbonamide) remains unconverted. Since the alcohol is usually the cheaper ingredient, it is preferable to use it in excess. The exact amount used is not critically important, but preferably amounts to from 50 to 300% excess.

In the process of this invention any acid which possesses a hydrogen ionization constant at least as great as $1 \times 10^{-2}$ in aqueous solution including, in addition to those employed in the examples, hydrogen bromide, trichloroacetic acid, oxalic acid, pyrophosphoric acid, sulfamic acid, sodium bisulfate and phosphoric acid. The preferred catalysts are those strong acids which are hygroscopic, e. g., HCl and $H_2SO_4$ and thus expedite the reaction by partially immobilizing the water formed. Acids having a strong oxidizing or reducing action are to be avoided because they tend to destroy the poly(N-methylolcarbonamide) ingredient. Acids having a strong oxidizing or reducing action such as iodic, nitric, hydriodic, sulfurous, phosphorous, etc. are generally not preferred since, although they are operable, they introduce side reactions such as partial destruction of the poly(N-methylolcarbonamide) compound which leads to lessened yields. Among the acid catalysts, hydrogen chloride is especially suitable and is also preferred because adhering traces of it are most easily removed from the product due to its volatility.

The quantity of acid-type catalyst may be varied within wide limits. Since etherification of the poly (N-methylolcarbonamide) takes place at a detectable rate when any catalyst is present, very small proportions of catalyst, e. g., 0.001 or less equivalent based on the poly(N-methylolcarbonamide), are operable. In order to effect the reaction at a conveniently rapid rate, however, it is desirable to use higher proportions of catalyst, preferably from 0.01 to 0.5 equivalent based on the poly(N-methylolcarbonamide). If the polycarbonamide contains a basic group additional acid must be present to neutralize this group, over and above the requirement for the etherification reaction. While a still greater excess is within the scope of the invention, it is usually avoided because (1) it does not facilitate the process and (2) the operation of removing the unreacted catalyst from the product is unnecessarily prolonged.

The temperature at which the reaction is conducted must be maintained sufficiently low to avoid the decomposition of the N-methylol ether groups. Side reactions resulting in such decompositions occur at temperatures as low as 100° C., or lower when an acid-type catalyst is present. At very low temperatures the reaction may be impeded by the low solubility of the poly(N-methylolcarbonamide) in the reaction medium, and the duration of the process must be prolonged to attain complete reaction. Thus, while the process is not limited to temperatures within the following limits, a temperature between 0° C. and 70° C. is preferred. The range of temperatures between 0° C. and 40° C. is especially suitable.

The order in which the reactants are brought into contact is immaterial. Thus, it is permissible to add the poly(N-methylolcarbonamide) to a solution of the acid-type catalyst in the alcohol.

The apparatus in which the process is conducted is, in general, constructed of a material resistant to the action of acid-type catalysts and it not limited to any particular design. It is usually preferabl, although not essential, to make provision for thorough mixing of the reacants and for exclusion of atmospheric moisture. Either subatmospheric, atmospheric, or superatmospheric pressure may be employed, and the process is not limited to any particular conditions of illumination.

The ethers of poly(N-methylolcarbonamides) of this invention, especially those which resinify readily, are useful in a considerable number of technical applications. Thus they may be used in resin-forming reactions with polyhydric compounds, with polythiols, and with compounds containing at least two amino hydrogen atoms, in modifying alkyd and urea-formaldehyde resins, and in textile finishing treatments.

The reaction of methylol ethers with polyhydric compounds leads to new and useful resinous materials. The reaction occurs with such ease and rapidity that it can be carried out in a compression molding procedure. Thus, polyvinyl alcohol (present to the extent of 60–80%) molded with the N,N'-bis(methoxymethyl) derivatives of succinamide, adipamide, or sebacamide yields tough, strong, translucent, light-colored objects. Likewise, wood flour or cork is converted by compression molding with a poly-(methylol ether) to moldings characterized by good resistance to boiling water. Other useful resinous compositions result when an ether of poly(N-methylolcarbonamide) is heated with a glycol such as 1,12-octadecanediol, with a polythiol such as decamethylene dithiol, with a compound containing at least two amino hydrogen atoms, such as a primary amine (e. g. aniline), or with a diseconary amine (e. g. N, N'-dimethylhexamethylenediamine). The properties of such products range from soft, thermosetting waxes to spongy, tough masses whose strength is increased by baking.

In coating compositions the N-methylol ethers of adipamide and sebacamide possess the ability to promote flexibility in alkyd urea-formaldehyde compositions. Thus, a film cast from a resin comprising N,N' - bis(methoxymethyl) adipamide (20%) castor oil-modified alkyd resin (40%), and urea- formaldehyde resin (40%) has very good toughness, flexibility hardness, and rate of baking, while a similar formulation in which the methylol ether is omitted is too brittle to be of practical value. Striking results are also obtained when ethers of poly (N-methylol carbonamides) supplant the urea-formaldehyde resin of commercial coating compositions. For example, a formulation comprising drying oil modified alkyd resin (75%) and N,N'-bis(methoxymethyl) adipamide (25%) gives an air-drying finish superior in flexibility and toughness to a composition containing the alkyd and urea-formaldehyde resins in the same proportions. It is also possible to prepare useful coatings from the product of this invention without the admixture of any other resin-forming material. Thus, films cast from the molten methylol ethers of adipamide and succinamide or tack-free, water-resistant, colorless, glossy, and very hard after baking.

As textile finishing agents the products of the invention confer excellent crease resistance on cotton cloth. When introduced into solutions of cellulose acetate and resinified by heating after the cellulose acetate has been regenerated in pellicle form, those agents reduce the solubility of the pellicles. Ethers of poly(N-methylolcarbonamides) also improve the crease resistance of fabrics composed of linear polyamide filaments when applied to the fabricated article from solution. This subject is including in my copending application Serial No. 410,484, filed September 11, 1941.

The above description and examples are intended to be illustrative only. Any modification of or variation therefrom which conforms to the spirit of the invention is intended to be included within the scope of the claims.

What is claimed is:

1. A process which comprises reacting a compound containing a plurality of N-methylolcarbonamido groups joined to a hydrocarbon radical under substantially anhydrous conditions at a temperature between 0 and 40° C. in the presence of an acid catalyst having an acid dissociation constant of at least $1 \times 10^{-2}$ with an alcohol containing up to five carbon atoms in which the carbinol carbon atom bears at least one hydrogen atom.

2. A process which comprises reacting a compound containing a plurality of N-methylolcarbonamido groups joined to an aliphatic hydrocarbon radical under substantially anhydrous conditions at a temperature between 0 and 40° C. in the presence of an acid catalyst having an acid dissociation constant of at least $1 \times 10^{-2}$ with an alcohol containing up to five carbon atoms in which the carbinol carbon atom bears at least one hydrogen atom.

3. A process which comprises reacting a compound containing two N-methylolcarbonamido groups joined to an aliphatic hydrocarbon radical under substantially anhydrous conditions at a temperature between 0 and 40° C. in the presence of an acid catalyst having an acid dissociation constant of at least $1 \times 10^{-2}$ with an alcohol containing up to five carbon atoms in which the carbinol carbon atom bears at least one hydrogen atom.

4. A process which comprises reacting a compound containing two N-methylolcarbonamido groups joined to an aliphatic hydrocarbon radical under substantially anhydrous conditions at a temperature between 0 and 40° C. in the presence of hydrogen chloride with an alcohol containing up to five carbon atoms in which the carbinol carbon atom bears at least one hydrogen atom.

5. A process which comprises reacting a compound containing two N-methylolcarbonamido groups of the formula R(CONHCH₂OH)  wherein R is an aliphatic hydrocarbon radical under substantially anhydrous conditions at a temperature between 0 and 40° C. in the presence of hydrogen chloride with an alcohol containing up to five carbon atoms in which the carbinol carbon atom bears at least one hydrogen atom.

6. A process which comprises reacting a compound containing two N-methylolcarbonamido groups of the formula R(CONHCH₂OH) wherein R is an aliphatic hydrocarbon radical under substantially anhydrous conditions at a temperature between 0 and 40° C. in the presence of hydrogen chloride with a primary aliphatic, monohydric alcohol containing up to five carbon atoms.

7. A process which comprises reacting a compound containing two N-methylolcarbonamido groups of the formula R(CONHCH₂OH) wherein R is an aliphatic hydrocarbon radical under substantially anhydrous conditions at a temperature between 0 and 40° C. in the presence of hydrogen chloride with methanol.

8. A monomeric, crystalline compound of the formula $$R(CONHCH_2OR')_x$$

wherein R is an aliphatic hydrocarbon radical of valence $x$, R' is an alkyl radical of up to five carbon atoms and, on the carbinol carbon, at least one hydrogen and $x$ is at least two.

9. A monomeric, crystalline compound having a plurality of N-alkoxymethylcarbonamido groups wherein the alkyl of the alkoxy radical contains up to five carbon atoms and has its free valence stemming from a carbon which also bears at least one hydrogen atom.

10. A monomeric, crystalline compound having two N-alkoxymethylcarbonamide groups wherein the alkyl of the alkoxy radical contains up to five carbon atoms and has its free valence stemming from a carbon which also bears at least one hydrogen atom.

11. A monomeric, crystalline compound of the formula $$R(CONHCH_2OR')_2$$

wherein R is a bivalent saturated aliphatic hydrocarbon radical and R' is an alkyl radical of up to five carbon atoms having at least one hydrogen on the carbon from which stems the free valence of the alkyl radical.

12. A monomeric, crystalline compound having two N-alkoxymethylcarbonamido groups wherein the alkyl radical of the alkoxy group is of up to five carbon atoms and has its free valence stemming from a carbon attached to at least two hydrogen atoms.

13. A monomeric, crystalline compound having two N-methoxymethylcarbonamido groups.

14. Monomeric crystalline N,N'-bis(methoxymethyl)adipamide.

15. Monomeric crystalline N,N'-bis(methoxymethyl)oxamide.

16. Monomeric crystalline N,N'-bis(methoxymethyl)sebacamide.

FRANK CLIFTON McGREW.

CERTIFICATE OF CORRECTION.

Patent No. 2,364,737. December 12, 1944.

FRANK CLIFTON McGREW.

It is hereby certified that error appears in the printed specification of the above numbered patent requiring correction as follows: Page 1, first column, line 4, for "The" before "invention" read --This--; page 2, first column, line 1, for "NN,'" read --N,N'--; line 56, for "carbont" read --carbon--; and second column, line 25, for "methylolcarbonamide" read --methylolcarbonamido--; page 3, first column, line 69, for "it" read --is--; line 71, for "preferabl" read --preferable--; and second column, line 43, after "flexibility" insert a comma; line 61, for "or" read --are--; page 4, second column, line 28, claim 10, for "N-alkoxymethylcarbonamide" read --N-alkoxymethylcarbonamido--; and that the said Letters Patent should be read with this correction therein that the same may conform to the record of the case in the Patent Office.

Signed and sealed this 20th day of March, A. D. 1945.

Leslie Frazer (Seal) Acting Commissioner of Patents.